United States Patent Office 3,316,807
Patented May 2, 1967

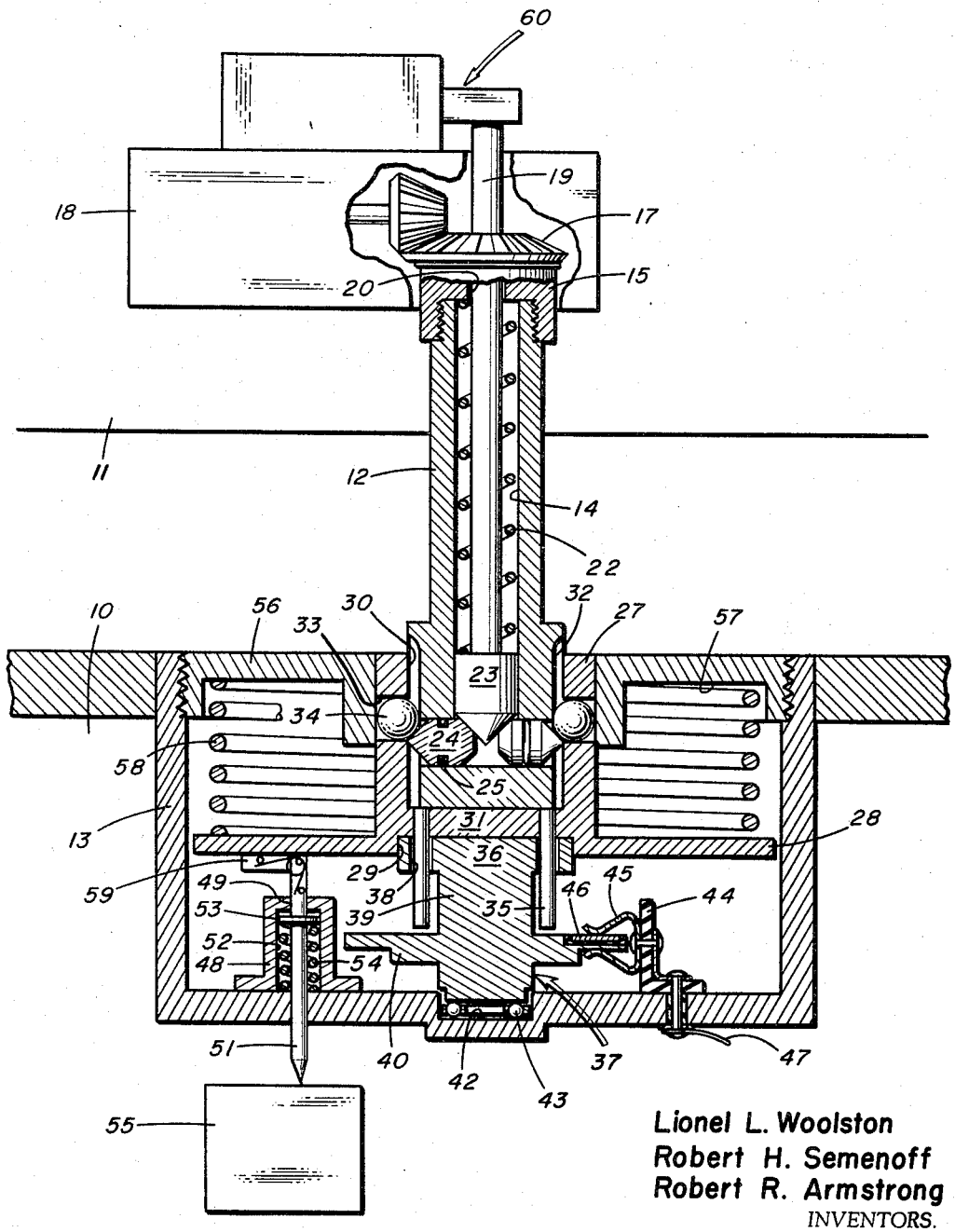

3,316,807
BOMB-FUZE FUNCTION SELECTOR
AND INITIATOR
Lionel L. Woolston, Silver Spring, Robert H. Semenoff, Takoma Park, and Robert R. Armstrong, Silver Spring, Md., assignors to the United States of America as represented by the Secretary of the Navy
Filed Oct. 22, 1965, Ser. No. 502,754
5 Claims. (Cl. 89—1.5)

The invention described herein may be manufactured and used by or for the Government of the United States of America for governmental purposes without the payment of any royalties thereon or therefor.

The present invention relates generally to a mechanical aircraft-weapon link and more particularly to a device for permitting in-flight selection of one of multiple fuzing functions within a bomb and for starting the fuzing sequence of operations within the bomb as it is dropped from an aircraft only when the bomb is intentionally launched therefrom for the purpose of destroying a target.

For safety reasons, it is the practice to delay the beginning of the arming cycle of a bomb until it starts its travel away from the aircraft that is carrying the bomb. Various methods have been proposed and employed for providing this arming delay and they include both mechanical and electrical fuzing. With mechanical fuzing, the selections of different fuzing functions that may be made in flight from within the aircraft cockpit are very limited. Many of the mechanical fuzes are provided with arming wires which run from the bomb fuze to an actuating device on the bomb rack and which permit the bomb to be jettisoned in a safe condition, when desirable, if the actuating device is not first energized. However, at the high speeds obtained by modern fighter-bombers, these arming wires can be blown off and thereby present a safety problem. On the other hand, many present day bombs are electrically armed and in such cases it is necessary to have an electrical connection between the aircraft and the fuze in the bomb. The chief problem encountered through use of this electrical connection between the aircraft and the bomb stems from the fact that the connection is subject to radiation hazards, that is, the entrance therein of electromagnetic radiation from electronic equipment aboard the aircraft or upon the surrounding decks of aircraft carriers, which can prematurely arm the bomb. Moreover, in the latter case, a special bomb fuze-charging power supply is required, which increases the complexity of the weapon and also is subject to failures.

The general purpose of this invention is to provide a mechanical aircraft-weapon link which embraces all of the advantages of similarly employed fuze devices and possesses none of the aforedescribed disadvantages. To attain this, the present invention must provide a rugged mechanical connection between the bomb and the launching aircraft for fuzing purposes which will permit the pilot to jettison the bomb safely or to select one of multiple fuzing functions and thereafter start the fuzing sequence of operations. Accordingly, the invention includes an electric motor-solenoid combination with two concentric shafts located on and projecting from a bomb rack into a mating receptacle and housing located within the bomb, a rotatable ball-lock connection between the outer motor-driven shaft and the housing within the bomb, a switch plate within the housing for making different fuzing selections as the outer shaft is rotated, and a stab-initiated thermal battery for starting the fuzing cycle only when the bomb is intentionally launched from the aircraft, as evidenced by the energization of the solenoid.

An object of the present invention is to provide a mechanical aircraft-weapon link for enabling setting of a bomb fuze to a selected function after the aircraft is in flight.

Another object of the present invention is to provide a fuze function-selector and initiator that is not affected by electromagnetic radiation.

Still another object of the present invention is to provide a rugged mechanical aircraft-weapon bomb-arming link for initiating the fuzing sequence of operation within the bomb only when the bomb is intentionally launched in anger.

Yet another object of the present invention is to provide a mechanical aircraft-weapon bomb-arming link that permits the pilot to jettison the bomb safely or, alternatively, to select one of multiple fuzing functions to be started only when the bomb is intentionally launched.

Other objects and various further features of novelty and invention will be apparent to those skilled in the art from a reading of the following specification and claims in conjunction with the accompanying drawing, which shows, for illustrative purposes only, a preferred form of the invention and in which the single figure discloses an elevational view, partly in section, of the preferred embodiment of the invention.

In the illustrated example of the invention, the reference numeral 10 designates the bomb that is carried by a bomb rack 11 by support means, not shown. The bomb rack 11, which is carried by an aircraft, is mechanically connected to the bomb 10 by means of a shaft 12 positioned on and projecting downwardly from the bomb rack 11 into a mating cavity formed within a housing 13 located in the bomb 10 and secured therein by a unique ball-lock arrangement to be hereinafter described.

The shaft 12 is provided with an axial bore 14 therein which is closed at the end thereof positioned within the bomb rack 11 by a cap member 15 threadably engaged to the outer peripheral surface of the shaft 12 and pinned thereto. The cap member is provided with a bevel gear 17 pressed or otherwise secured thereto which cooperates with another bevel gear driven through a gear train by an electric motor 18 positioned within the bomb rack 11 for permitting the shaft 12 to be rotatably driven by the motor. A second shaft 19 concentric with shaft 12 is positioned within the axial bore 14 therein and projects out of cap member 15 through an aperture 20 in the end face thereof, passing through the gear box of motor 18 to the other side of the motor. Positioned within the bore 14 of shaft 12 and surrounding inner shaft 19 is a coil spring 22 abutting at one end thereof the cap member 15 and at the other end a wedge portion 23 integrally connected to shaft 19, so as to urge the shaft 19 and wedge 23 downwardly toward the end of the outer shaft that is received within housing 13, as aforementioned. The wedge 23 abuts a pair of cylindrical pistons 24 contained within the lower end of shaft 12 in radial apertures formed in the side wall thereof and opening into vertical grooves 32 formed therein, the openings being staked so as to retain the pistons therein. The radial cylindrical pistons 24 are formed with annular grooves therein for receiving O-rings 25 for the purpose of sealing the outer shaft 12 when the device is not connected to the bomb.

Housing 13 in the bomb 10 contains a cylindrical member 27 having a flange 28 at one end thereof, a first axial bore 29 formed in said one end, a second axial bore 30 formed in the other end thereof, and a transverse wall 31 separating the first and second bores and cooperating with the second bore 30 to define the cavity within housing 13 for receiving the lower end of outer shaft 12 containing the radial cylindrical pistons 24. The cylinder wall is provided with a pair of radial apertures 33 in the vicinity of the second bore 30, each containing a ball 34 of greater diameter than the thickness of the cylindrical wall and being slightly movable transversely thereof, yet being retained therein by staking.

A pair of pins 35 are firmly connected to the lower side of the transverse wall 31 and extend perpendicularly therefrom through the cavity defined by the lower bore 29. Also positioned within the bore 29 in close fitting relation therewith and abutting a lower side of the transverse wall 31 is the flat circular end 36 of a substantially spool-shaped member 37 having a pair of apertures 38 therein for receiving the pins 35 when properly aligned therewith. The spool 37 is comprised of a cylindrical body 39 having the aforementioned integral circular flange 36 positioned thereon at its upper end and a second flange 40 having a diameter somewhat larger than that of upper flange 36 positioned near the lower end of body 39, but slightly spaced therefrom. The bottom portion of the cylindrical member 39 fits within a circular central well 42 formed in the bottom wall of housing 13 and rests therein upon a set of ball bearings 43 positioned within spherical seats in the bottom of the well and being of such dimension as to extend slightly above the seats and into the well 42 for the purpose of reducing friction and permitting ready rotation of the cylindrical member 39 in the well 42 about its longitudinal axis. A central pin of suitable configuration and attachment may be provided for the purpose of maintaining the spool 37 seated at all times within the well 42. Secured to the bottom wall of housing 13 are a plurality of upstanding support structures 44 for stationary spring contacts 45 spaced circumferentially about the lower flange 40 of spool 37. The lower flange 40 serves as a switch plate, having arcuate contacts 46 secured to the upper surface thereof, whereby when spool 37 is rotated a contact 46 may be engaged by at least two of the contacts 45 so as to complete a selected circuit for a given fuze function. Leads 47 connect the switches within housing 13 to the circuits positioned outside the housing and within the fuze portion of the bomb. One of the support structures 44 comprises a cylindrical member 48 flanged at one end for securing to the housing bottom and having a bore 49 therethrough for slideably receiving the rod portion of a stabber member 51 and a counterbore 52 for slideably receiving a flange 53 on the stabber rod and for housing a coil spring 54 which abuts the flange 53 and the bottom of housing 13 and urges the stabber 51 upward so that the flange 53 thereon engages the shoulder defined at the juncture of the bore 49 and the counterbore 52.

The upper end of housing 13 is closed by a substantially flat tubular member 56 threadably engaged therewith and having an annular recess 57 in the end wall thereof facing into the housing for receiving one end of a coil spring 58 which abuts at its other end with the upper surface of flange 28 of cylindrical member 27, thereby urging the cylinder 27 downward within the housing 13, holding pins 35 against switch plate 40 and spool 37 against bearings 42 in the housing bottom.

When so closed, the upper end of the stabber 51 just contacts the flange 28 of cylindrical member 27 and the lower end of the stabber passes through an aperture in the bottom wall of housing 13 and contacts a percussion-type starter for a thermal battery 55 positioned just outside the housing 13 within the fuze of the bomb. An extension member 59 pivotally hinged to the upper end of stabber rod 51 is normally held down by the flange 28 of cylinder 27 and is spring-biased so that movement of the rod 51 away from the flange 28 a distance equal to the length of extension 59 permits the extension member to be pivoted into an upright position on the rod 51, thereby increasing the effective length of the stabber rod.

Finally, a solenoid actuated stop means 60 is provided within the bomb rack 11 for engaging the upper end of the shaft 19 and preventing any movement thereof in an upward direction. When current is removed, of course, the solenoid withdraws the stop means 60, thereby permitting upward movement of the shaft 19 if a force is introduced causing such movement.

In operation, in securing the bomb 10 to the aircraft bomb-rack 11, the bomb is moved upward toward the bomb rack until outer shaft 12 protruding from the bomb rack is received within the cavity of housing 13 defined by the upper bore 30 in cylindrical member 27. The balls 34 are positioned so as to protrude slightly into the cavity of bore 30 and are prevented from movement therefrom by the inner wall of the tubular housing end-closure 56 which abuts the outer wall of cylindrical member 27. Therefore, during this step, the solenoid for the stop means 60 should not be energized, so that as the balls 34 engage the radial cylindrical pistons 24, they may move the pistons slightly inward, compressing the spring 22 and urging wedge 23 upward. In this manner, the balls 34 may in effect "slide-over" the radial pistons 24, while moving within the vertical grooves 32 and formed in the outer peripheral wall of shaft 12, whereupon the spring-biased wedge 23 again urges the radial pistons 24 outwardly, locking balls 34 in grooves 32 thereabove. With the balls 34 so positioned within vertical grooves 32 of the shaft 12, rotation of the cylindrical member 27 may be effected simultaneously with rotation of the shaft 12 by motor 18. Since the cylindrical member 27 is linked to the spool 37 by pins 35, any rotational movement of the cylindrical member 27 will likewise be transmitted to the spool 37. Thus, it may be seen that selection of a given fuzing function may be obtained by the aircraft pilot through rotation of shaft 12 a predetermined amount, since the switch plate 40 on spool 37 is similarly rotated, and a preselected arcuate contact 46 thereon may be brought into engagement with a given pair of stationary contacts 45 positioned circumferentially thereabout.

When the bomb is to be dropped intentionally for the purpose of destroying a target, the solenoid is first energized so that stop means 60 engages the inner shaft 19 to prevent any upward movement thereof, thus negating the possibility of forcing the radial cylindrical pistons 24 inward of the shaft 12 against wedge portion 23. Therefore, as the bomb begins to fall away from the bomb rack, cylindrical member 27 housing the balls 34 is momentarily unable to move with the bomb because of the ball-lock connection effected with the bomb-rack shaft 12 by balls 34 and cylindrical pistons 24. Housing 13, however, is secured to the bomb for concurrent and simultaneous movement therewith, and in so doing the inner wall of housing cap member 56 slides along the outer peripheral wall portion of cylinder 27, passing over apertures 33 and the balls 34 positioned therein. Movement of the housing 13 with respect to cylinder member 27 in this manner causes spring 58 to be tightly compressed between housing cap member 56 and the lower flange 28 of cylindrical member 27. When the cap member 56 has sufficiently traversed the outer wall of cylindrical member 27, apertures 33 become exposed and the compressed spring 22 urges wedge 23 of inner shaft 19 downward, pushing radial cylindrical pistons 24 outward and forcing the balls 34 back from grooves 32 so that the cylindrical member 27 may be withdrawn from attachment with outer shaft 12. Once free from its connection to the bomb rack the cylindrical member 27 returns to its original position within housing 13 under the force of compressed spring 58, and the lower flange 28 thereof strikes the now-extended extension member 59 of the stabber 51 causing it to initiate the thermal battery 55, thus starting the fuzing sequence of operations within the preselected fuzing function.

Should a situation arise which makes dropping of the bomb in an unarmed condition desirable, the present invention makes it possible to jettison the bomb safely. This is accomplished simply by not applying current to the solenoid, thus keeping stop means 60 withdrawn from its position of engagement with shaft 19 and so permitting upward movement of the shaft. Dropping of the bomb in this case causes balls 34 to force the radial cylindrical pistons 24 inward, causing shaft 19 and wedge 23 integral therewith to move upward slightly against the pressure of spring 22, and thus permitting balls 34 to "slide-over" the radial cylindrical pistons 24. Housing 13 and cylindrical member 27 are not moved with respect to each other and spring 58 is not compressed, and consequently the stabber 51 is not initiated. Thus, even if a fuzing function has already been selected, if an emergency dictated jettisoning of the bomb, it could be accomplished safely without initiation of the fuze.

It may be seen therefore that, with the present invention, a rugged connection is provided between the aircraft and the bomb which cannot be blown off, even at high speeds, and which is not subject to radiation hazards, yet which may be quickly assembled an disassembled. Also, the number of fuzing functions available is not limited and the pilot may make the selection in flight.

Obviously many modifications and variations of the present invention are possible in the light of the above teachings. It is therefore to be understood, that within the scope of the appended claims, the invention may be practiced otherwise than as specifically described.

What is claimed is:

1. In combination with an aircraft, an aircraft drop bomb, a bomb fuze function selector and initiator comprising:
    a housing positioned within the bomb,
    a plurality of stationary spring contacts arranged in a circle near the bottom wall of said housing,
    a switch plate rotatably mounted in said housing within the area of said circle and contacted by all of said stationary spring contacts,
    arcuate contacts mounted on said switch plate and so spaced as to permit switching between the circuits of a plurality of fuzing functions as the switch plate is rotated,
    a cylindrical member positioned above said switch plate and rotatably coupled therewith,
    said cylindrical member having an annular flange on the end thereof facing said switch plate and an axial bore in the opposite end,
    coil spring means acting between said flange and the upper wall of said housing and urging said cylindrical member toward the bottom of said housing,
    a rod member positioned in said housing beneath said flange and having a stabber portion extending through the bottom wall of said housing for initiating a battery starter,
    and means within the aircraft releasably coupled to said housing for rotating said cylindrical member and said switch plate to select one of said fuzing functions and adapted to momentarily hold said cylindrical member stationary as the bomb begins to fall away, thereby compressing said spring means so that when uncoupling from the aircraft takes place the spring drives the cylindrical member and the stabber portion of said rod downward within the housing to initiate the sequence of operations within the fuzing function selected.

2. The device of claim 1 wherein said cylindrical member is further provided with a plurality of apertures in the wall thereof defining said bore having a ball of greater diameter than the thickness of the wall movably positioned within each aperture and staked therein for retention,
    and in which said releasable coupling means comprises a motor-driven shaft adapted to be received within the axial bore of said cylindrical member,
    an inner shaft axially displaceable within said motor-driven shaft and extending beyond the upper edge of the motor-driven outer shaft,
    cylindrical pistons positioned in radial apertures in the lower end of said outer shaft and staked therein for retention,
    spring means urging said inner shaft downward against said pistons,
    said pistons and balls forming a ball-lock connection when said outer shaft is received within said axial bore, and
    stop means movable between first and second positions and adapted in one of said positions to prevent any upward movement of the inner shaft.

3. The device of claim 1 wherein said rod member is provided with a spring-loaded extension member at the upper end thereof which is normally held in the unextended position by said cylindrical member flange, and is adapted to become extended whenever said housing moves with respect to said cylindrical member.

4. The device of claim 2 further including a solenoid for actuation of said stop means.

5. A bomb fuze function selector and initiator comprising:
    a pair of concentric shafts normally connectable to an aircraft bomb rack and adapted to extend downward therefrom, the outer shaft being rotatable and the inner shaft being axially displaceable therein,
    stop means for selectively preventing displacement of said inner shaft within said outer shaft,
    a housing within said bomb,
    a set of stationary contacts and a rotatable switch plate operatively associated therewith and positioned within said housing,
    a stabber for a battery starter,
    releasable coupling means between said outer shaft and said housing for transmitting the rotational movement of the outer shaft to said switch plate, for normally urging axial displacement of said inner shaft during separation of said housing from said outer shaft, and for actuating the stabber when a bomb incorporating the fuze is dropped and only when such axial displacement is prevented by said stop means.

No references cited.

SAMUEL W. ENGLE, *Primary Examiner.*